(12) United States Patent
Sclease et al.

(10) Patent No.: US 6,684,895 B2
(45) Date of Patent: Feb. 3, 2004

(54) FLUID CONTROL VALVE APPARATUS AND METHOD

(76) Inventors: Joseph Licari Sclease, 3472 Maikai Dr., Pensacola, FL (US) 32526; Gary Lynn Williams, 11 New Mexico Dr., Pensacola, FL (US) 32505

(*) Notice: Subject to any disclaimer, the term of this patent is extended or adjusted under 35 U.S.C. 154(b) by 0 days.

(21) Appl. No.: 10/094,054

(22) Filed: Mar. 8, 2002

(65) Prior Publication Data

US 2003/0168098 A1 Sep. 11, 2003

(51) Int. Cl.[7] .................................. F16K 3/00
(52) U.S. Cl. ................... 137/12; 137/219; 137/220; 137/614.11
(58) Field of Search ................. 137/12, 219, 220, 137/614.11

(56) References Cited

U.S. PATENT DOCUMENTS 3,963,044 A * 6/1976 Brown .................... 137/220

OTHER PUBLICATIONS

"ALJAC 4 Litre Closed Circuit Sampler, User's Guide," 1996, Aljac Engineering Ltd., Emsworth, Hants, UK.

* cited by examiner

Primary Examiner—Gerald A. Michalsky
(74) Attorney, Agent, or Firm—J. Nevin Shaffer, Jr.

(57) ABSTRACT

An improved fluid control valve includes a valve body with an inlet and an outlet. A sealing member is connected to the valve body conformed to seal the inlet and form a pressure chamber. A push rod is connected to the sealing member and a sleeve is provided which encompasses the push rod. A piston, forming an equalization chamber, is connected to the sleeve and to the push rod so that when the piston moves in one direction the sealing member is moved in the opposite direction until camover when both move in the same direction.

20 Claims, 7 Drawing Sheets

US 6,684,895 B2

FLUID CONTROL VALVE APPARATUS AND METHOD

TECHNICAL FIELD OF THE INVENTION

This invention relates to fluid control valves. In particular, this invention relates to an improved fluid control valve apparatus and method for the transfer of fluids in a safe and controlled manner.

BACKGROUND OF THE INVENTION

The prior art is replete with valves designed to ensure the controlled transfer of fluids. Many specialized valves have been developed for various industries. Nonetheless, no single valve has been developed that is capable of operating safely throughout a wide range of operating pressures. Additionally, prior art valves are not easily adjustable so as to accommodate a range of operating pressures.

By way of example and not by limitation, the transfer of aviation gasoline and jet fuel poses several difficult problems. To begin with, the type of fuel contained in a tanker fuel delivery truck must be ascertained with certainty. A plane that runs on aviation gasoline will not run on jet fuel and vice versa. Additionally, these fuel transfers are difficult since the transfers are typically done from the tanker trucks to underground storage vessels at fuel farms with the only means of transfer being gravity flow. What is required in this situation, and many others, is a controllable valve capable of precise performance in low pressure environments. Further, a fluid control valve is required that is also easily adaptable for use in high-pressure environments as well. Hazardous locations with explosive atmospheres such as these raise many additional concerns such as the risks of providing electrical power to transfer devices.

Thus, there is the need in the art for providing an improved fluid control valve apparatus and method controllable for use in low and high-pressure environments, which is safe and easy to use and that does not increase the risks normally associated with the transfer of fluids.

SUMMARY OF THE INVENTION

Accordingly, the improved fluid control valve of the present invention includes a valve body with an inlet and an outlet. A sealing member is connected to the valve body and is conformed to seal the inlet and form a pressure chamber. A push rod is connected to the sealing member and a sleeve, encompassing the push rod, is provided. A piston, forming an equalization chamber, is connected to the sleeve and to the push rod so that when the piston moves in one direction the sealing member is moved in the opposite direction.

In a further aspect of the invention, a first port is provided in the pressure chamber operable between an open position and a closed position. A second port is provided in the equalization chamber and is connected to the first port when the first port is open. In another aspect of the invention, a third, bypass, port is connected to the second port when the first port is in the closed position for directing fluid leaking into the equalization chamber away from the equalization chamber.

In another aspect of the invention, a connecting arm, with a first end and a second end, is connected to the piston on the first end. A leverage generator is connected to the second end of the connecting arm and a pivotable push rod is connected to the leverage generator and to the push rod.

In a further aspect of the invention, a first spring encompasses the sleeve and urges the piston towards the inlet. A second spring encompasses the push rod and urges the sealing member toward the outlet so as to seal the inlet. In a another aspect of this invention, the connecting arm and leverage generator cooperate such that the leverage generator pivots to a position where the second spring urges the sealing member towards the inlet.

In yet another aspect of the invention, a sensor for testing the fluid prior to delivery is provided and the sensor includes a specific gravity meter and a sight glass.

In another preferred embodiment of the invention, in a system where fluid is transferred from one vessel to another, a method of controlling fluid flow includes the steps of forming a valve body with an inlet and an outlet. A sealing member is connected to the valve body and is conformed to seal the inlet and form a pressure chamber. A push rod is connected to the sealing member. The push rod is encompassed by a sleeve. A piston is connected to the sleeve, so as to form an equalization chamber behind the pressure chamber, and to the push rod so that when the piston moves in one direction the sealing member is moved in the opposite direction.

A first port is formed in the pressure chamber operable between an open position and a closed position. A second port is formed in the equalization chamber connected to the first port when the first port is open so that when fluid is introduced in the pressure chamber and the first port is opened fluid in the pressure chamber will be directed through the first and second port and fluid will fill the equalization chamber thereby equalizing the pressure between the pressure chamber and the equalization chamber. The fluid then forces the piston towards the outlet causing the sealing member to move away from the inlet and opening the valve. Next, a discharge line is connected to the inlet and a fill line is connected to the outlet. Finally, fluid is introduced into the valve and the first port is opened.

In a further aspect of the method of the invention, a connecting arm, with a first end and a second end, is attached to the piston at the first end. A leverage generator is connected to the second end of the connecting arm and a pivotable push rod is connected to the leverage generator and to the push rod.

In another aspect of the invention, a first spring is attached to the sleeve such that the first spring urges the piston towards the inlet and a second spring is attached to the push rod such that the second spring urges the sealing member toward the outlet so as to seal the outlet. In a further aspect of the invention, the connecting arm and the leverage generator are connected such that the leverage generator rotates to a "cam over" position where the second spring urges the sealing member towards the inlet.

In a further aspect of the invention, the spring tensions are adjusted for the first and second springs such that the valve opens and shuts at any desired fluid pressure. And, in yet a another aspect of the invention, a timer is added to the valve for delaying the closing of the valve for a predetermined time after fluid flow is stopped.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE INVENTION

Figure 1:
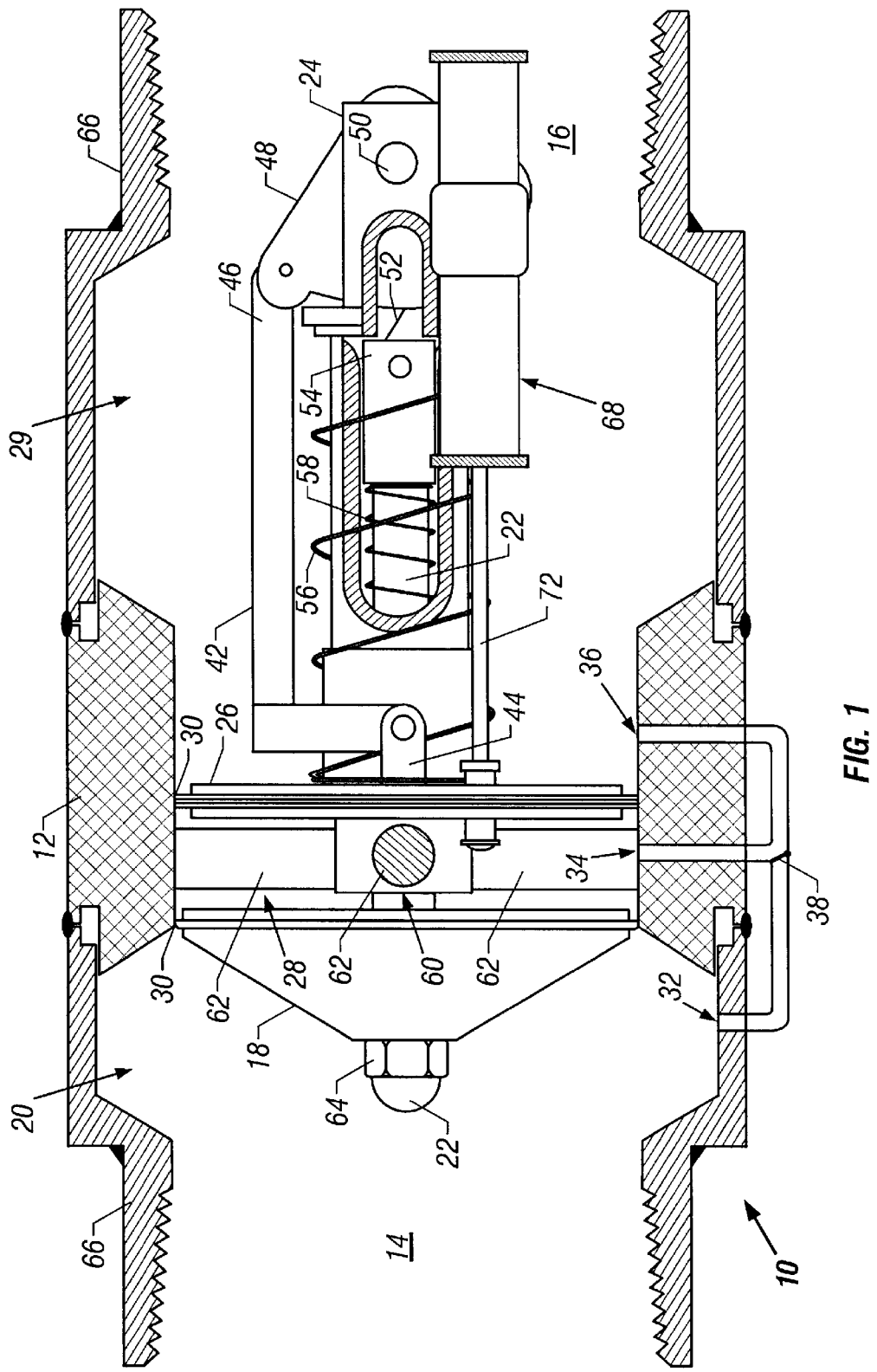
FIG. 1 is a side partial section view of the fluid control valve of the present invention in the closed position.

The preferred embodiment of the present invention is illustrated by way of example in FIGS. 1–8. With specific reference to FIGS. 1 and 2, the improved fluid control valve 10 of the present invention includes a valve body 12 with an inlet 14 and an outlet 16. Sealing member 18 is connected to valve body 12, as illustrated and as will be discussed more fully hereafter, and is conformed to seal the inlet 14 against valve body 12 as illustrated thereby forming pressure chamber 20. Push rod 22 is connected to sealing member 18. Sleeve 24 encompasses push rod 22. Sleeve 24 is illustrated as partially cut away so as to reveal push rod 22 and other components of the invention as will be discussed more fully hereafter. Piston 26 is connected to sleeve 24 and push rod 22, as will be discussed more fully hereafter, so that when piston 26 moves in one direction the sealing member 18 is moved in the opposite direction. Piston 26 forms equalization chamber 28.

Figure 2:
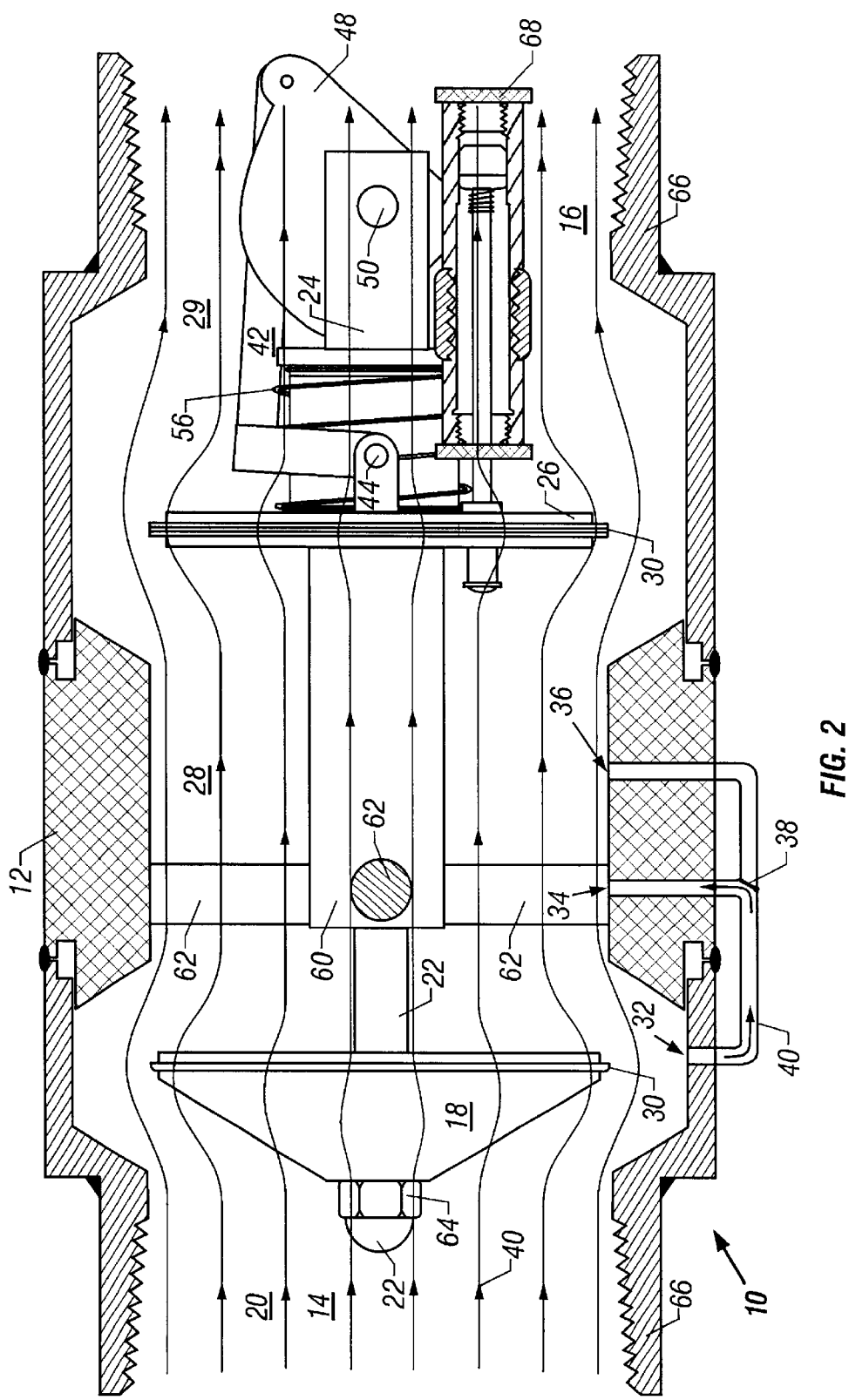
FIG. 2 is a side partial section view of the invention in the open position.

FIG. 1 shows improved fluid control valve 10 in the closed position. Sealing member 18 includes flexible sealing lip 30 that accommodates various debris that may be introduced into a fluid and yet still forms a tight, leak proof, seal. Also illustrated in FIGS. 1 and 2, are three ports, first port 32, second port 34 and third port 36. As illustrated in FIG. 1, in the closed position, improved fluid control valve 10 has first port 32 closed and second port 34 open to third, bypass, port 36. In this position, any fluid that might leak through or past sealing member 18 into equalization chamber 28 is directed from second port 34 to third port 36. Thereafter any minimal fluid leak can be directed through outlet 16 to an unpressurized containment vessel. First port 32 may be closed by a flapper valve 38 or any other appropriate means now known or hereafter developed. Additionally, for the purposes of the present invention, the valve closer, a flapper valve 38 for example, is designed to be operable in response to a very minimal electrical current as will be discussed more fully hereafter.

By way of contrast, referring now to FIG. 2, flapper valve 38 is shown as having moved to close the path from second port 34 to third port 36. As a result, the path from first port 32 to second port 34 is now open. Again, as will be discussed more fully hereafter, opening first port 32 to the second port 34 allows fluid 40, as shown by the directional arrows, to flow from pressure chamber 20 into equalization chamber 28, thereby beginning the opening process of fluid control valve 10 and allowing fluid 40 to pass from inlet 14 through fluid control valve 10 valve body 12 to discharge chamber 29 and outlet 16.

FIGS. 1 and 2 also illustrate connecting arm 42 with a first end 44 and a second end 46. First end 44 is connected to piston 26. Leverage generator 48 is connected at one point to the second end 46 of connecting arm 42. Leverage generator 48 is movably connected to, and pivots around, connection 50 with sleeve 24. Additionally, leverage generator 48 is connected to pivotable push rod 52. Pivotable push rod 52 is also connected to push rod 22. As illustrated, bushing 54 is affixed to the tail end of push rod 22 and acts as the pivot point for pivotable push rod 52.

Also illustrated in FIGS. 1 and 2 are first spring 56 and second spring 58. First spring 56 encompasses sleeve 24 and urges piston 26 towards inlet 14 in the closed position. Second spring 58 encompasses push rod 22, as shown in the partial cut away section of FIG. 1, and urges the sealing member 18 towards outlet 16 so as to assist in sealing inlet 14.

FIG. 2 shows first spring 56 fully compressed and exerting maximum pressure to return piston 26 toward inlet 14. As will be more fully discussed hereafter, once leverage generator 48 cams over and is fully rotated, second spring 58 is released in the opposite direction so as to urge sealing member 18 towards inlet 14. In this position the force of the two springs is adjustably counteracted so that only the user's desired amount of pressure, large or small, is required to keep the valve 10 open.

FIGS. 1 and 2 also illustrate flexible sealing lip 30 on piston 26 and stationery guide bushing 60. Stationery guide bushing 60 is supported by bushing supports 62. Push rod 22 passes through stationery guide bushing 60 and is held in that centered position by the combination of stationery guide bushing 60 and sleeve 24. Push rod 22 is secured to sealing member 18 by lock nut 64 after having passed through sealing member 18, as illustrated. Also illustrated are threaded connectors 66 attached to the inlet 14 side of valve 12 and the outlet 16 side of the valve 12. Threaded connectors 66 are used to connect to fluid transfer hoses and the like (not shown) and may obviously be of any size appropriate to the fluid being transferred.

Figure 3:
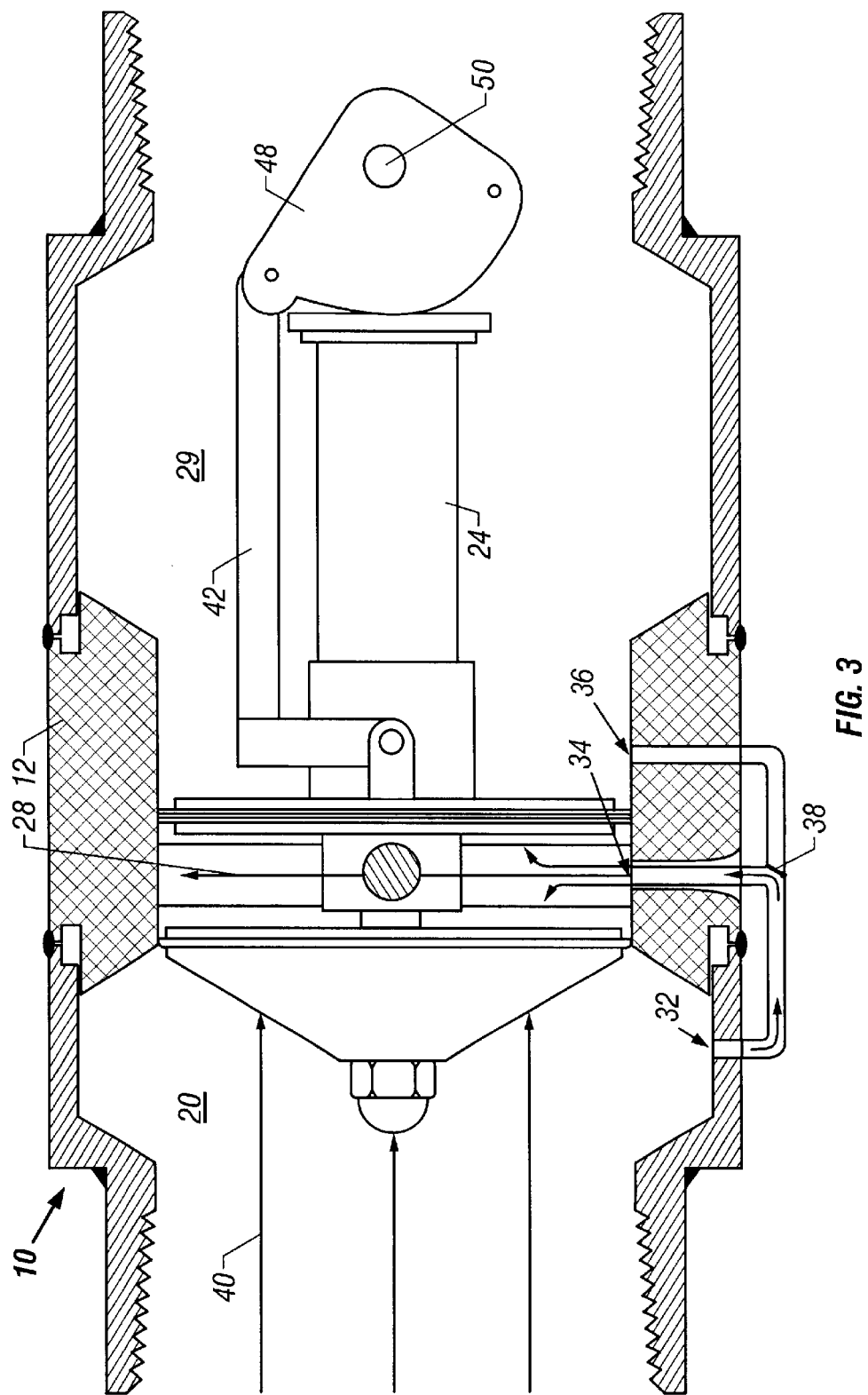
FIG. 3 is a simplified side partial section view of the invention in the closed position.

Referring now to FIGS. 3, 4, 5, and 6, the operation of improved fluid control valve 10 will be discussed in more detail. FIG. 3 shows fluid control valve 10 at the beginning of the opening cycle wherein fluid 40 has been allowed, by the opening of the first port 32 to second port 34, to flow from pressure chamber 20 into equalization chamber 28. Up to this point, fluid control valve 10 has been in the closed position by operation of an external solenoid control valve, manual valve or the like. Pressurized fluid 40, or any other gas or fluid, enters pressure chamber 20 and actually helps hold sealing member 18 in the closed position. Once again, operating the external control valve (not shown), and allowing first port 32 and second port 34 to communicate, allows fluid 40 to flow into equalization chamber 28.

Figure 4:
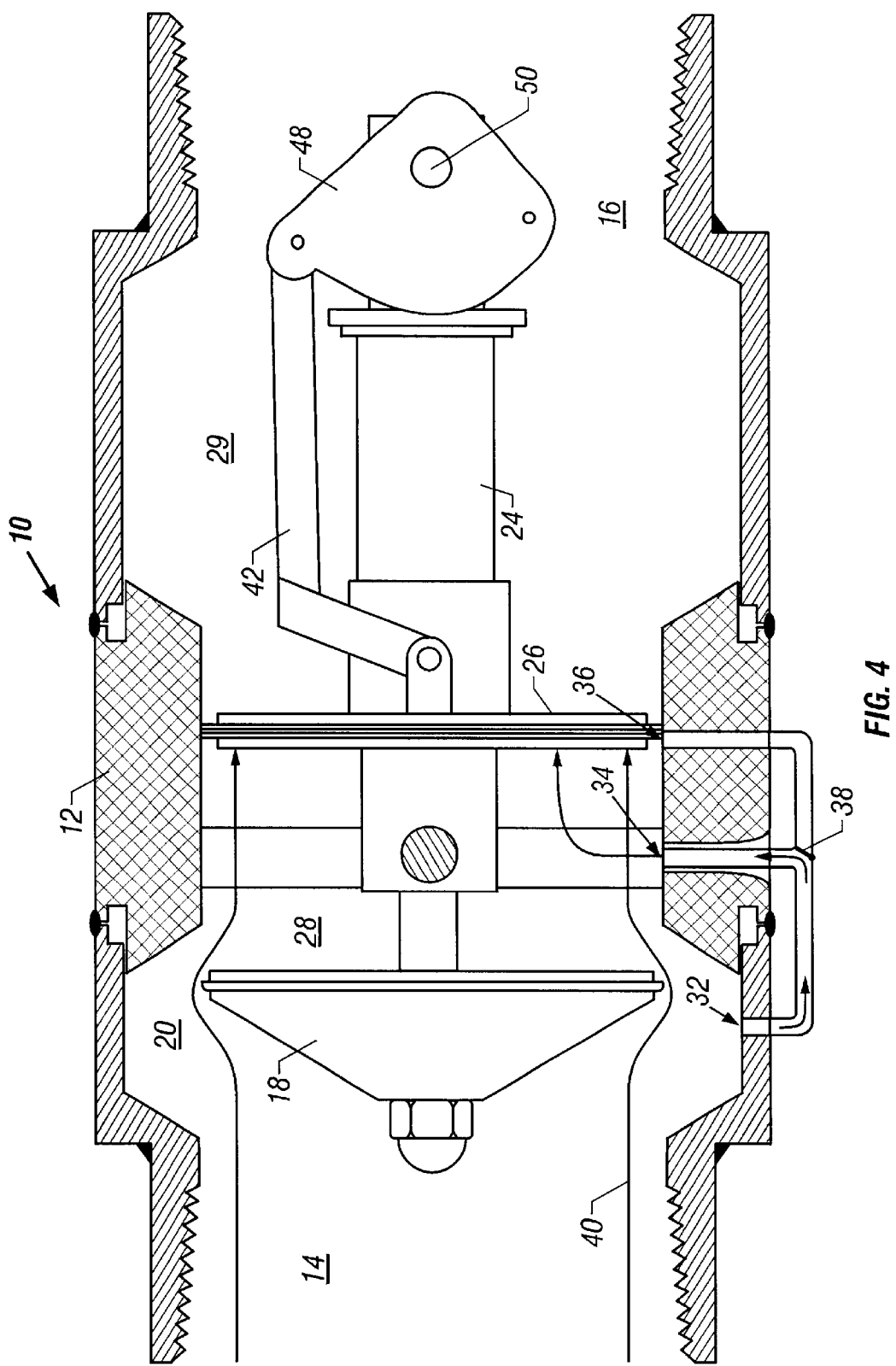
FIG. 4 is a side partial section view of the invention as illustrated in FIG. 3 as the valve begins to open.

FIG. 4 shows that the piston 26 has been moved rearward within valve body 12 in the direction of outlet 16 by the pressure from fluid 40. The movement of piston 26 towards outlet 16 results in push rod 22 moving sealing member 18 away from its sealed position in the direction of inlet 14. As a result, fluid 40 now passes around sealing member 18 and directly impacts the inlet side of piston 26 adding ever-increasing amounts of pressure on piston 26, moving it in the direction of outlet 16. As a result, the control solenoid, manual valve, or the like used to begin the process may be turned off. Once equalization of the pressure has occurred between pressure chamber 20 and equalization chamber 28, very little closing pressure is being exerted on sealing member 18 except by springs 56 and 58 and piston 26 now receives the benefit of the inlet pressure of the fluid 40. The product of this pressure equals the force acting on piston 26. The pressure in equalization chamber 28 is now equal to the pressure in pressure chamber 20 and is greater than the pressure in discharge chamber 29. This pressure differential allows piston 26 to move in the direction of lower pressure, i.e. discharge chamber 29.

As piston 26 is reacting to the opening force being exerted upon it, this force is also directed though connecting arm 42 to leverage generator 48. Leverage generator 48 is located by connection point 50 along the center line of sleeve 24 creating a pivot point. This pivot point is the center of an arch that references to zero degrees when aligned along the center line of the sleeve 24. The pivot point is located at a point somewhere between ten and ninety degrees of the arch. The radii being fixed, the leverage generator 48 now begins to rotate around the center connection 50 pivot point.

This rotation acts on the third pivot point, the pivotable push rod 52. The radii of this arc can be equal to or greater than the arc for the leverage generator 48. The intersection is located somewhere between one hundred-eighty degrees and three hundred and fifty degrees as referenced to the zero degrees above. For the purposes of this explanation, inlet 14 is "up" and outlet 16 is "down". Therefor, zero degrees is "up" and one hundred eighty degrees is "down". As leverage generator 48 begins to rotate, connecting arm 42 moves leverage generator 48 and leverage generator 48 moves along an arc down toward one hundred-eighty degrees. Simultaneously, pivotable push rod 52 rotates upward in the direction of zero degrees. As pivotable push rod 52 is acted upon it moves upward and acts on push rod 22 connected to sealing member 18 and in unison begins to compress first and second springs 56 and 58.

As sealing member 18 is moved upward, it is lifted off the sealing surfaces at the entrance of valve 12. Again, fluid 40, or gas of any type, begins to flow around sealing member 18 into equalization chamber 28 increasing the volume of fluid or gas entering equalization chamber 28. Increased flow equates to increased speed of movement of piston 26 in the down ward direction toward discharge chamber 29. Piston 26 continues to move in the downward direction until the leverage generator 48 and the pivotable push rod 52 pivot point passes from three hundred fifty-nine degrees to zero degrees to minus one degree. Zero degrees is referenced as top dead center (TDC). TDC of the pivot occurs at or about the same time that piston 26 exits valve body 12 as shown FIG. 5.

Figure 5:
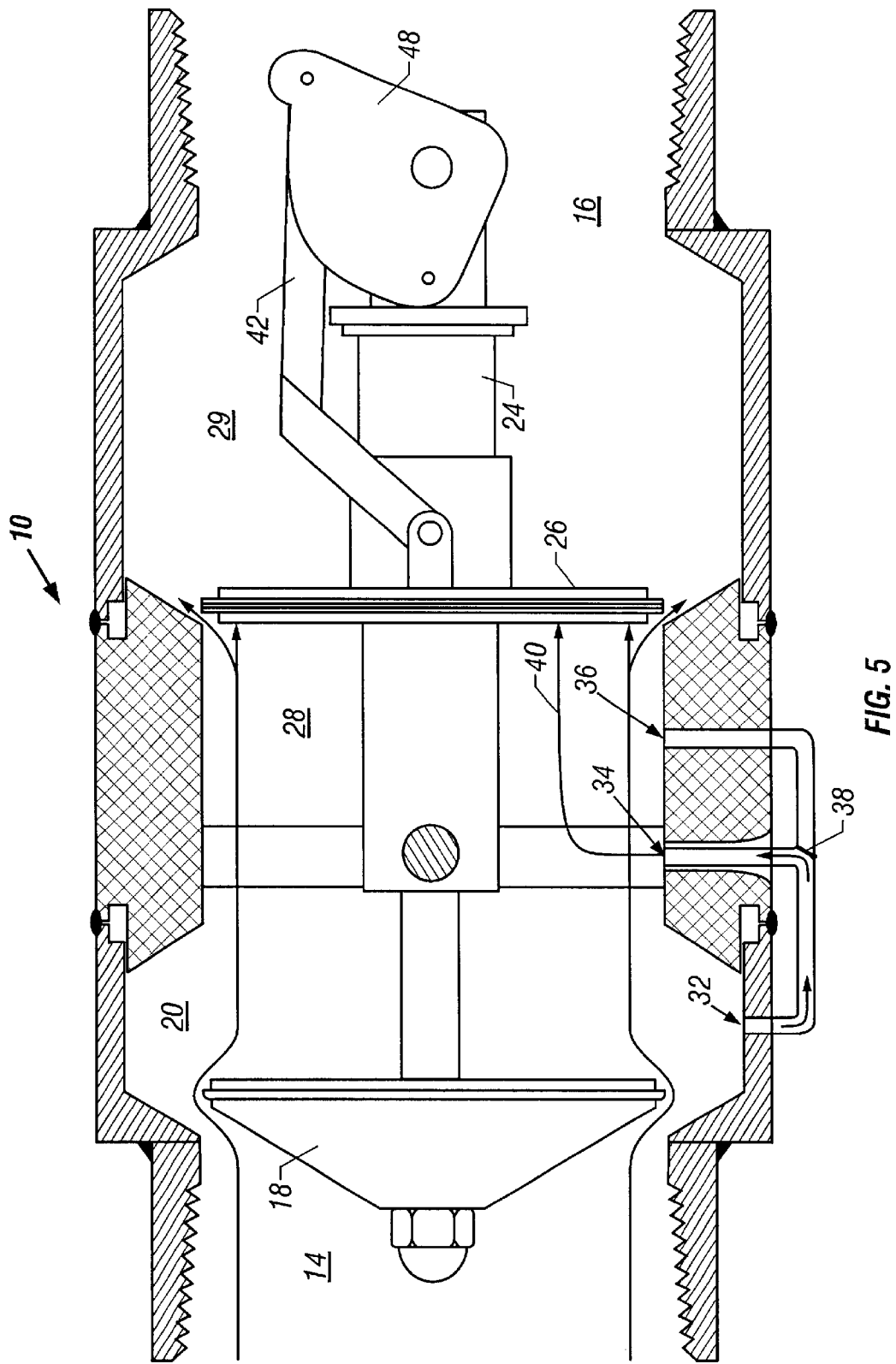
FIG. 5 is a side partial section view of the invention as illustrated in FIGS. 3 and 4 as the valve just opens allowing fluid to flow from the inlet to the outlet.

Referring now to FIG. 5, at this time second spring 58 has been compressed to its maximum spring rate. The sealing member 18 has been lifted to its maximum height allowing an open flow area greater than or equal to the flow area of the inlet supply line at pressure chamber 20. Piston 26 continues down toward and into discharge chamber 29 until it engages a fixed stop located at the base of sleeve 24.

Figure 6:
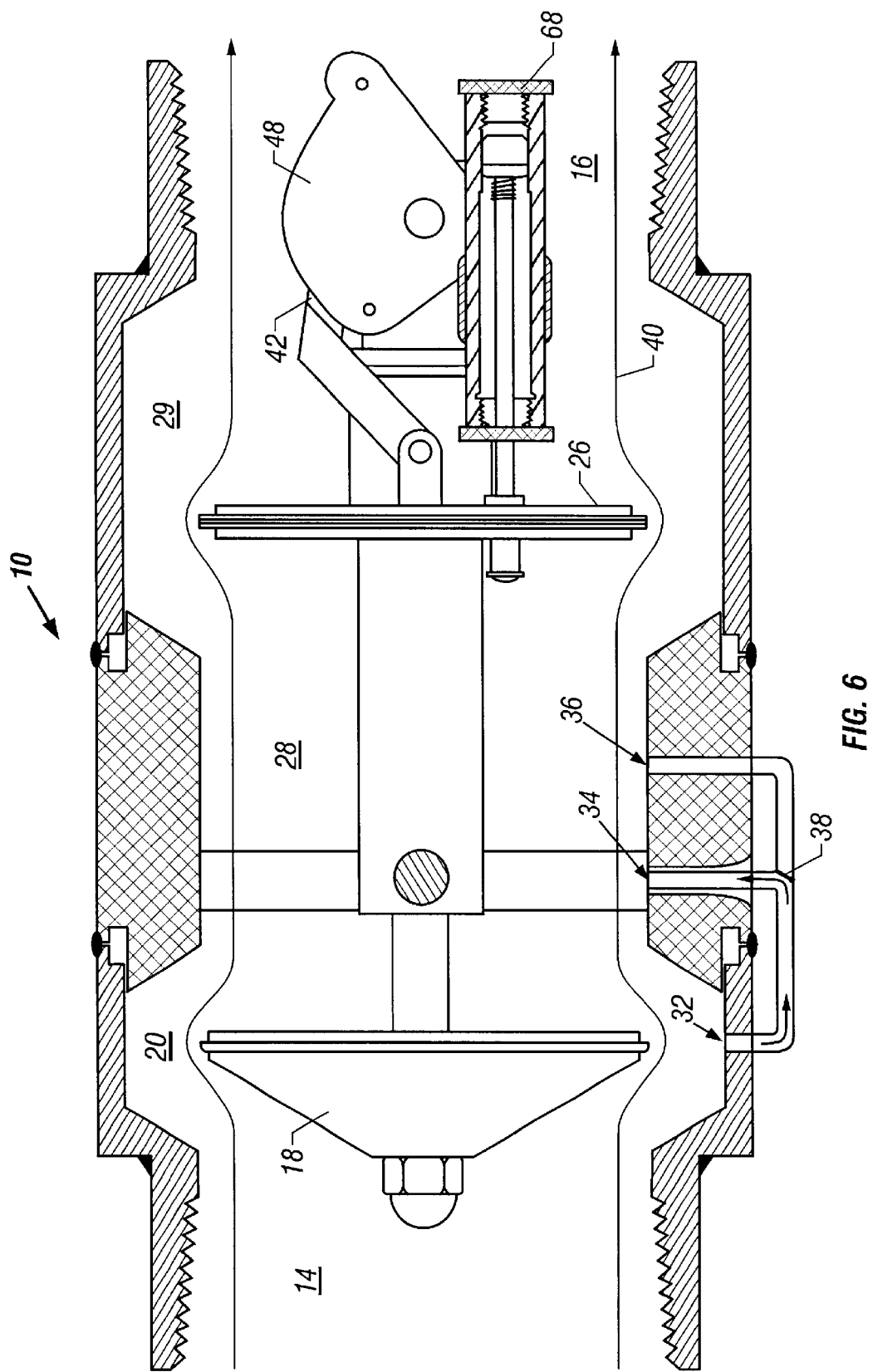
FIG. 6 is a side partial section view of the invention as illustrated in FIGS. 3 through 5 showing the valve fully open.

Referring now to FIG. 6, at this point, piston 26 has move far enough from equalization chamber 28 into discharge chamber 29 thereby allowing a flow area greater than or equal to the supply in discharge lines of pressure chamber 20 and discharge chamber 29. As the leverage generator 48 and pivotable push rod 52 passes TDC, second spring 58, which had been urging sealing member toward outlet 16, begins to release its stored energy on bushing 54 and aids in the rotation of leverage generator 48 until piston 26 has engaged a mechanical stop on sleeve 24, as illustrated. The connecting arm 42 and leverage generator 48 pivot point is at a point on its arc less than or equal to one hundred eighty degrees Bottom Dead Center (BDC). During the movement of piston 26, first spring 56 is compressed, as illustrated, to its maximum stored energy state. It is important to note that the relationship of the spring rates of first spring 56 and second spring 58 to each other is crucial in understanding the adjustability of improved fluid control valve 10. Those of ordinary skill in the art will appreciate that the spring rates of first spring 56 and second spring 58 as well as the location of the pivots for leverage generator 48, connecting arm 42, and pivotable push rod 52 may be manipulated to respond to an extremely wide range of pressures and flow rates. That is to say, through adjustment of these elements improved fluid control valve 10 may be caused to remain sealed until a high-pressure point is reached and then operated and remained open until all pressure and flow has ceased or it may be used to relieve high-pressure in a line back to a safe pressure and then close and reset itself for the next event.

Figure 7:
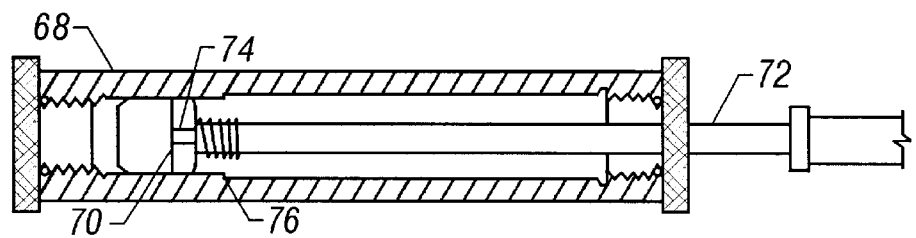
FIG. 7 is a side section view of a timing cylinder of the invention.

Referring now to FIG. 7, timing cylinder 68 is illustrated. In a preferred embodiment, timing cylinder 68 is fixed to sleeve 24 and includes movable piston 70. Movable piston 70 is valved and ported so as to move through a viscous fluid at a predetermined rate with a predetermined force acting upon it. Movable piston 70 is connected to piston rod 72 which is connected at an opposite end to piston 26. In operation, as fluid control valve 10 begins to open and piston 26 moves down equalization chamber 28 toward discharge chamber 29, movable piston 70 moves through the fluid stored in timing cylinder 68. Movable piston 70 includes one-way valve 74 that checks fluid flow in one direction only. Once the fluid 40 transfer is complete and piston 26 begins to move back to its position in equalization chamber 28, the movable piston 70 also begins to move back through timing cylinder 68. One-way valve 74 now allows the flow of fluid through timing cylinder 68 in a controlled manner by a meter or orifice of a predetermined size for a predetermined time of travel. This gives the timing cylinder 68 the ability to stay open for as long as a user may deem necessary. At or about the time that piston 26 enters the bore of the cylinder that is the equalization chamber 28, the timing sequence is complete. Movable piston 70 now passes enlarged porting 76 that allows movable piston 70 to pass unrestricted through timing cylinder 68. Hence rapid movement of piston 26 is enabled into equalization chamber 28 until solid contact of sealing member 18 with valve body 12 occurs. At this point, fluid control valve 10 is at rest, reset, and sealed.

Figure 8:
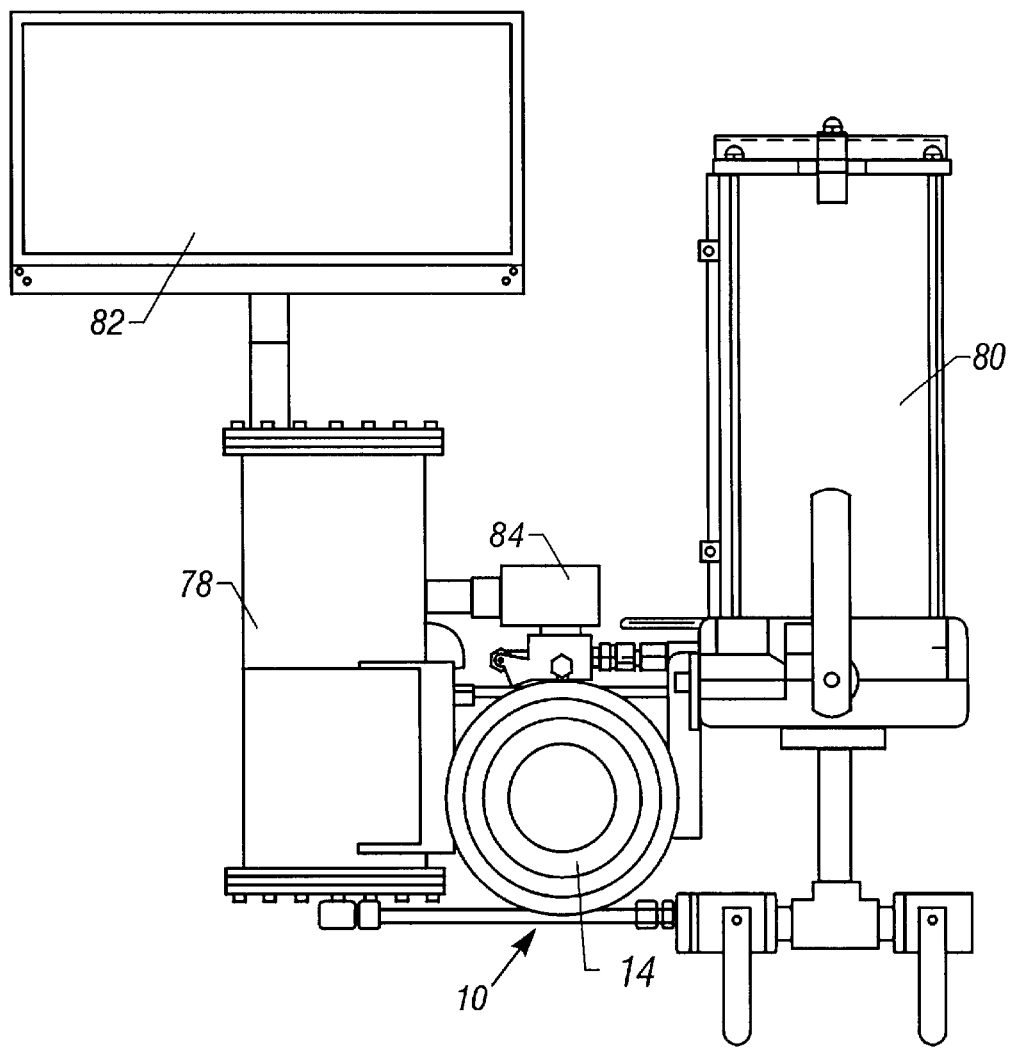
FIG. 8 is a front view of the valve of the present invention utilized in conjunction with a fuel sampler and a sight gauge.

Referring now to FIG. 8, a preferred embodiment of improved fluid control valve 10 is illustrated. In this embodiment, fluid control valve 10 is connected to a fuel sampler 78 and closed loop sampler 80. Also connected to control valve 10 is solar panel 82. By way of example and not by limitation, a fuel line is coupled up to the inlet 14 of valve 10. The outlet 16 is connected to the product receipt line of a permanent storage tank, for example. Once the tanker truck has hooked the discharge hose up to the inlet 14 of valve 10, the discharge hose is charged by opening the tanker's dump valve. Next, the closed loop sampler 80 is filled. Various known tests, such as a sight glass test, are performed. If all test results pass, fuel sampler 78 is filled. Fuel sampler 78 automatically verifies that the fuel is within the specific gravity guidelines for that particular desired type of fuel. If the fuel sampler 78 accepts the fuel as proper then solenoid valve 84 is energized for a predetermined length of time, such as 15 seconds. This then opens the connections to valve 10 and operates to connect first port 32 and second port 34 as discussed above, thus opening the valve 10. Once the fuel has been gravity drained through valve 10, timing cylinder 68 provides tanker operator enough time to drain the connection lines through valve 10 prior to valve 10 closing.

In a preferred embodiment fuel sampler 78 and closed loop sampler 80 are battery powered and recharged by means of solar panel 82. It has been determined by the applicants that this simple battery, solar collector arrangement provides enough current to safely and effectively operate fluid control valve 10 in even the most hazardous environments.

By way of continued explanation, in a preferred embodiment, fluid control valve 10 is designed as a low pressure high-volume one shot device. That is, a primary anticipated use of the valve 10 is to be able to operate with fluid pressures that range from 6 PSI down to 1.25 PSI, these being the pressures necessary to open valve 10 and to have valve 10 remain open until a tanker vessel has completely drained its fuel. Additionally, power consumption to control valve 10 has to be minimal. In accordance with the invention, this is accomplished by means of a small DC voltage solenoid 84. As previously discussed, the voltage required for operation is minimal since the device only needs to be energized until sealing member 18 is lifted off its seal on valve body 12 and fluid begins to flow from pressure chamber 20 to equalization chamber 28. Once this occurs, again as discussed above, the valve 10 supplies itself. Applicants have determined that the reaction time, from starting the opening process until the valve 10 is fully opened, varies from one second to fifteen seconds depending on the pressures involved and the length of the control lines. Again, and this embodiment, valve 10 is intended to be placed on a product receipt line on a liquid fuel storage tank such as where fuel product is received from tank trucks via a flexible hose. In these cases, typically, gravity flow procedure results in a low pressure and high-volume movement of fluid. Again, as discussed above, applicants' valve 10, in a preferred embodiment, is controlled by means of a connection with a fuel sampler 78 and closed loop sampler 80 so that, if a good sample is obtained, a signal with a short duration is sent to a control solenoid 84. Again, this activates valve 10 and commences the fluid 40 transfer process. Importantly, valve 10 remains open until all fluid flow influences on piston 26 have ended. When this happens, the stored energy in first spring 56 is able to overcome the energy in second spring 58 causing leverage generator 48 to rotate in the opposite direction until such time as both springs act together to rotate leverage generator 48 about its center pivot on sleeve 24. As previously discussed, thereafter piston 26 moves into equalization chamber 28 and sealing member 18 reseals itself against valve body 12.

The description of the present embodiments of the invention have been presented for purposes of illustration but are not intended to be exhaustive or to limit the invention to the form disclosed. Many modifications and variations will be apparent to those of ordinary skill in the art. The fluid control valve 10 of the present invention is adaptable to cover a wide range of pressures from very low i.e. 1 PSI to very high pressures. Valve 10 can be used as a one shot valve in that once opened it may be caused to remain open until flow ceases, and the reset itself for the next operation, as discussed above.

Further, it can be used as a self regulating pressure control that relieves excess pressure from tanks or pipelines without relieving below a predetermined set point. That is to say, if line pressure should be fifty PSI and it reaches sixty PSI the valve can be designed to open relieving the pressure to fifty PSI before closing again.

Additionally, valve 10 can be used as an emergency relief valve in that it may be configured to remain closed until a predetermined high-pressure is reached and at that point to open, relieving the pressure, and remaining open until the reason for the over pressure recurrence is repaired and the valve is manually reset.

Still further, the valve 10 can be used in place of ruptured disk devices on tanks where tank vents become clogged. In this situation a tank may become pressurized to a dangerous level even at very low PSI. With valve 10 installed, the valve 10 is designed to open and relieve over pressure before tank damage occurs. Likewise, valve 10 can be set to relieve vacuum as a fluid vessel is emptied to keep the tank from collapsing on itself.

As such, while the present invention has been disclosed in connection with the preferred embodiment thereof, it should be understood that there may be other embodiments which fall within the spirit and scope of the invention is defined by the following claims.

What is claimed is:

1. An improved fluid control valve comprising:
   a) a valve body with an inlet and an outlet;
   b) a sealing member connected to said valve body and conformed to seal the inlet and form a pressure chamber;
   c) a push rod connected to said sealing member;
   d) a sleeve encompassing said push rod; and
   e) a piston, forming an equalization chamber, connected to said sleeve and to said push rod so that when said piston moves in one direction said sealing member is moved in the opposite direction until camover when both said piston and said sealing member move in the same direction.

2. The apparatus of claim 1 further comprising:
   a) a first port in said pressure chamber operable between an open position and a closed position; and
   b) a second port in said equalization chamber connected to said first port when said first port is open.

3. The apparatus of claim 2 further comprising a third bypass port connected to said second port when said first port is in the closed position for directing fluid leaking into said equalization chamber away from the equalization chamber.

4. The apparatus of claim 1 further comprising:
   a) a connecting arm, with a first end and a second end, connected to said piston on the first end;
   b) a leverage generator connected to the second end of the connecting arm; and
   c) a pivotable push rod connected to the leverage generator and to the push rod.

5. The apparatus of claim 4 further comprising a spring means encompassing said push rod and urging said sealing member towards the outlet wherein said connecting arm and leverage generator cooperate such that said leverage generator pivots to a position where said spring urges said sealing member towards the inlet.

6. The apparatus of claim 1 further comprising:
   a) a first spring means encompassing said sleeve and urging said piston towards the inlet; and
   b) a second spring means encompassing said push rod and urging said sealing member toward the outlet so as to seal the inlet.

7. The apparatus of claim 1 further comprising a sensor for testing the fluid.

8. The apparatus of claim 7 wherein the sensor includes a specific gravity meter and a sight glass.

9. In a system wherein fluids are transferred from one vessel to another, a fluid control valve comprising:
   a) a valve body with an inlet and an outlet:
   b) a sealing member connected to said valve body and conformed to seal the inlet and form a pressure chamber;
   c) a push rod connected to said sealing member;
   d) a sleeve encompassing said push rod;
   e) a piston, conformed to form an equalization chamber, connected to said sleeve and to said push rod so that when said piston moves in one direction said sealing member is moved in the opposite direction
   f) a first port in said pressure chamber operable between an open position and a closed position;
   g) a second port in said equalization chamber connected to said first port when said first port is open;
   h) a connecting arm, with a first end and a second end, connected to said piston on the first end;
   i) a leverage generating cam connected to the second end of the connecting arm; and
   j) a pivotable push rod connected to the leverage generating cam and to the push rod.

10. The apparatus of claim 9 further comprising:
   a) a first spring encompassing said sleeve and urging said piston towards the inlet; and
   b) a second spring encompassing said push rod and urging said sealing member toward the outlet so as to seal the outlet.

11. The apparatus of claim 10 wherein said connecting arm and leverage generating cam cooperate such that said leverage generating cam rotates to a position where said second spring urges said sealing member towards the inlet.

12. The apparatus of claim 9 further comprising a sensor for testing the fluid prior to said fluid entering the equalization chamber.

13. The apparatus of claim 12 wherein the sensor includes a specific gravity meter and a sight glass.

14. In a system wherein fluid is transferred from one vessel to another, a method of controlling fluid flow comprising the steps of:
   a) forming a valve body with an inlet and an outlet;
   b) connecting a sealing member to said valve body, said sealing member conformed to seal the inlet and form a pressure chamber;
   c) connecting a push rod to said sealing member;
   d) encompassing said push rod with a sleeve;
   e) connecting a piston to said sleeve, so as to form an equalization chamber behind said pressure chamber, and to said push rod so that when said piston moves in one direction said sealing member is moved in the opposite direction until camover when both said piston and said sealing member move in the same direction;
   f) forming a first port in said pressure chamber operable between an open position and a closed position;
   g) forming a second port in said equalization chamber connected to said first port when said first port is open so that when fluid is introduced in said pressure chamber and said first port is open fluid in said pressure chamber is directed through said first and second ports and fluid fills said equalization chamber thereby equalizing the pressure between the pressure chamber and the equalization chamber and then the fluid forces the piston towards the outlet causing the sealing member to move away from the inlet and opening the valve;
   h) connecting a discharge line to the inlet and a fill line to the outlet; and
   i) introducing fluid into said valve and opening said first port.

15. The method of claim 14 further comprising the steps of:
   a) attaching a connecting arm, with a first end and a second end, to said piston at the first end;
   b) connecting a leverage generator to the second end of the connecting arm; and
   c) connecting a pivotable push rod to the leverage generator and to the push rod.

16. The method of claim 14 further comprising the steps of:
   a) attaching a first spring to said sleeve such that said first spring urges said piston towards the inlet; and
   b) attaching a second spring to said push rod such that said second spring urges said sealing member toward the outlet so as to seal the outlet.

17. The method of claim 16 further comprising the step of connecting a connecting arm to said piston and to a leverage generator such that said leverage generator rotates to a position where said second spring urges said sealing member towards the inlet.

18. The method of claim 16 further comprising the step of adjusting the spring tensions of the first and second spring such that the valve opens and shuts at any desired fluid pressure.

19. The method of claim 14 further comprising the step of adding a sensor for testing the fluid prior to said fluid entering the equalization chamber.

20. The method of claim 14 further comprising the step of adding a timer for delaying the closing of the valve for a predetermined time after fluid flow is stopped.

* * * * *